United States Patent
St. Pierre et al.

(10) Patent No.: US 7,890,633 B2
(45) Date of Patent: Feb. 15, 2011

(54) SYSTEM AND METHOD OF EXTENDING VIRTUAL ADDRESS RESOLUTION FOR MAPPING NETWORKS

(75) Inventors: Robert P. St. Pierre, Sunnyvale, CA (US); Germano Caronni, Mountain View, CA (US)

(73) Assignee: Oracle America, Inc., Redwood City, CA (US)

( * ) Notice: Subject to any disclaimer, the term of this patent is extended or adjusted under 35 U.S.C. 154(b) by 1200 days.

(21) Appl. No.: 10/367,548

(22) Filed: Feb. 13, 2003

(65) Prior Publication Data

US 2004/0162914 A1 Aug. 19, 2004

(51) Int. Cl.
G06F 15/16 (2006.01)
(52) U.S. Cl. ....................................... 709/227
(58) Field of Classification Search .............. 709/245, 709/227, 217
See application file for complete search history.

(56) References Cited

U.S. PATENT DOCUMENTS

| | | | | |
|---|---|---|---|---|
| 5,751,961 | A * | 5/1998 | Smyk | 709/217 |
| 6,101,552 | A * | 8/2000 | Chiang et al. | 709/245 |
| 6,631,416 | B2 * | 10/2003 | Bendinelli et al. | 709/227 |
| 6,691,165 | B1 * | 2/2004 | Bruck et al. | 709/227 |
| 7,028,333 | B2 * | 4/2006 | Tuomenoksa et al. | 726/3 |
| 7,028,334 | B2 * | 4/2006 | Tuomenoksa | 726/3 |
| 7,047,424 | B2 * | 5/2006 | Bendinelli et al. | 726/22 |
| 7,152,179 | B1 * | 12/2006 | Critchfield | 714/4 |
| 7,181,542 | B2 * | 2/2007 | Tuomenoksa et al. | 709/250 |
| 7,254,835 | B2 * | 8/2007 | St. Pierre et al. | 726/14 |
| 7,272,613 | B2 * | 9/2007 | Sim et al. | 1/1 |
| 7,380,021 | B2 * | 5/2008 | Boden | 709/245 |
| 2002/0116526 | A1 * | 8/2002 | Brown | 709/245 |
| 2002/0138628 | A1 * | 9/2002 | Tingley et al. | 709/227 |
| 2002/0147844 | A1 * | 10/2002 | Denecheau et al. | 709/245 |
| 2002/0186698 | A1 * | 12/2002 | Ceniza | 370/401 |
| 2003/0069993 | A1 * | 4/2003 | Na et al. | 709/245 |
| 2003/0154236 | A1 * | 8/2003 | Dar et al. | 709/201 |
| 2003/0200334 | A1 * | 10/2003 | Grynberg | 709/245 |

OTHER PUBLICATIONS

User's Guide, Connectix, Virtual PC for Macintosh Version 4.0, Dec. 2000.*
Egevang, K., et al., The IP Network Address Translator (NAT), May 1994, RFC 1631, pp. 1-10.*

(Continued)

*Primary Examiner*—Wing F Chan
*Assistant Examiner*—Alicia Baturay
(74) *Attorney, Agent, or Firm*—Marsh Fischmann & Breyfogle LLP; Jonathon A. Szumny; Kent A. Lembke

(57) ABSTRACT

A method of associating a range of destination IP addresses with a real IP address for use with the Virtual Address Resolution Protocol is disclosed. The destination addresses may be a range of virtual IP addresses in a virtual network or a range of real IP addresses in a physical network. A record of the association of the range of destination addresses with a single real IP address is stored in a Virtual Address Resolution Protocol lookup table which is utilized when sending messages from a virtual IP address. The ability to assign a range of destination addresses to a single real IP address represents an extension of the use of VARP. The association of multiple destination addresses to a single real IP address allows an electronic device to function as a router to a widely distributed real or virtual network. The virtual network of the present invention adds a layer of encryption to the originating virtual network by sending encrypted data packets between the origin and destination addresses.

14 Claims, 5 Drawing Sheets

OTHER PUBLICATIONS

Rekhter, Y. et al., An Architecture for IP Address Allocation with CIDR, Sep. 1993, RFC 1518, pp. 1-27.*

Srisuresh, P. et al., Traditional IP Network Address Translator (Traditional NAT), Jan. 2001, RFC 3022, pp. 1-16.*

* cited by examiner

Figure 2

| | Type | Destination | Resolves to: |
|---|---|---|---|
| 50 | Virtual | 10.0.0.1 --> | 152.70.0.1 |
| 51 | Virtual | 10.0.0.10 --> | 152.70.0.10 |
| 52 | Virtual | 11.0.0.1 --> | 152.70.0.1 |
| 53 | Virtual Range | 11.0.0.0/24 --> | 152.70.0.1 |
| 54 | Physical Range | 129.63.1.0 129.63.1.255 --> | 152.70.0.1 |
| 55 | Default | | 152.70.0.1 |

SYSTEM AND METHOD OF EXTENDING VIRTUAL ADDRESS RESOLUTION FOR MAPPING NETWORKS

FIELD OF THE INVENTION

The illustrative embodiment of the present invention relates generally to virtual networks, more particularly to a method of extending a virtual address resolution protocol.

RELATED APPLICATION

The illustrative embodiment of the present invention is related to an invention described in U.S. patent application Ser. No. 09/457,896 filed in December 1999.

BACKGROUND

A virtual network is a logical network overlaid on a physical network. A virtual network allows a virtual IP (Internet Protocol) address to be assigned to individual processes running on a computer or other electronic device. The use of a virtual network allows for an extension of the computer's physical resources since a virtual network's components such as processes are not restricted to a one-to-one relationship with the physical devices in the computer system and network. Messages may be sent to a process at a virtual IP address which is separate from the real IP address used by the network device upon which the process is executing.

The Address Resolution Protocol is used in the physical network to resolve a four byte (or sixteen bytes in the case IPV6) IP address into a six byte MAC (Media Access Control) address through the use of a lookup table. A MAC address is an address assigned to an interface for a physical component interfaced with the network. For example, an Ethernet card includes a unique MAC address which identifies the physical device on the network. Messages sent to an IP address are delivered to the resolved MAC address of the network connected piece of hardware. The message is then forwarded from the network interface identified by the MAC address to the destination application on the physical device. The Virtual Address Resolution Protocol (VARP) performs a function for the virtual network similar to that of the Address Resolution Protocol (ARP) in the physical network. VARP resolves a virtual IP address into a real IP address through the use of a lookup table. Once the real IP address corresponding to the virtual IP address has been determined, the real IP address may then be resolved through an ARP lookup into a MAC address. The message intended for the virtual IP address may is delivered to the network interface. The message is then forwarded from the MAC address to the real IP address where the header is stripped and and then forwarded to a virtual IP address destination.

Unfortunately, the current implementation of VARP is restricted to associating a single virtual IP address with a real IP address in a VARP lookup table. This limits the ability to send messages to distributed external virtual networks. Furthermore, virtual IP addresses are restricted to communicating with other virtual IP addresses as only virtual IP addresses are resolved during a VARP lookup.

BRIEF SUMMARY OF THE INVENTION

The illustrative embodiment of the present invention provides a method of extending VARP so that it includes a many-to-one mapping of virtual addresses to a real IP address. Ranges of virtual IP addresses are associated with a real IP address in a VARP cache or in a lookup table. As a result of the range of addresses being mapped to the real IP address, the virtual IP address is no longer restricted to being an end node. Encrypted data is forwarded to a MAC address resolved from the real IP address associated with a range of virtual IP addressees and then forwarded from the resolved MAC address to the real IP address where the header is stripped and the packet is decrypted and then forwarded to the final virtual IP address destination. Additionally, the present invention allows a range of real IP addresses to be mapped to a single real IP address in the VARP table. This allows a process on a virtual network to directly address an address on a real network beyond a device at the edge of the virtual network.

In one aspect of the present invention, a virtual network is supported by a physical network. The virtual network includes a range of virtual IP addresses. The range of virtual IP addresses are associated with a single real IP address. The single real IP address identifies a physical component interface in the network. The associations between the range of virtual IP addresses and the single real IP address are stored in a network-accessible location and data is sent over the network to a virtual IP destination address from an originating virtual IP address.

In a different aspect of the present invention, a first physical network supports a virtual network. The first physical network is interfaced with a second physical network through a common electronic device that is interfaced with both physical networks. The virtual network includes a lookup table to resolve destination addresses into a real IP address. Ranges of real IP addresses are associated with a single real IP address of a component of the common electronic device and the association is stored in the lookup table for the virtual network.

BRIEF DESCRIPTION OF THE DRAWINGS

FIG. 2 is a block diagram of VARP associations;

DETAILED DESCRIPTION

The illustrative embodiment of the present invention provides a method of associating a range of destination IP addresses in a network with a real IP address. The destination addresses may be a range of virtual IP addresses in a virtual network or a range of real IP addresses in a physical network. A record of the association of the range of destination addresses with a single real IP address is stored in a Virtual Address Resolution Protocol lookup table which is utilized when sending messages from a virtual IP address. The ability to assign a range of destination addresses to a single real IP address represents an extension of the use of VARP . The association of multiple destination addresses to a single real IP address allows an electronic device to function as a router to a widely distributed real or virtual network. The placement of a mapping of a range of physical IP addresses into a virtual IP lookup table allows the destinations referenced by the physical addresses to be directly addressed from within the virtual network. The virtual network of the illustrative embodiment (also referred to herein as a Supernet) adds a layer of encryption to the originating virtual network by sending encrypted data packets between the origin and destination addresses.

Figure 1A:
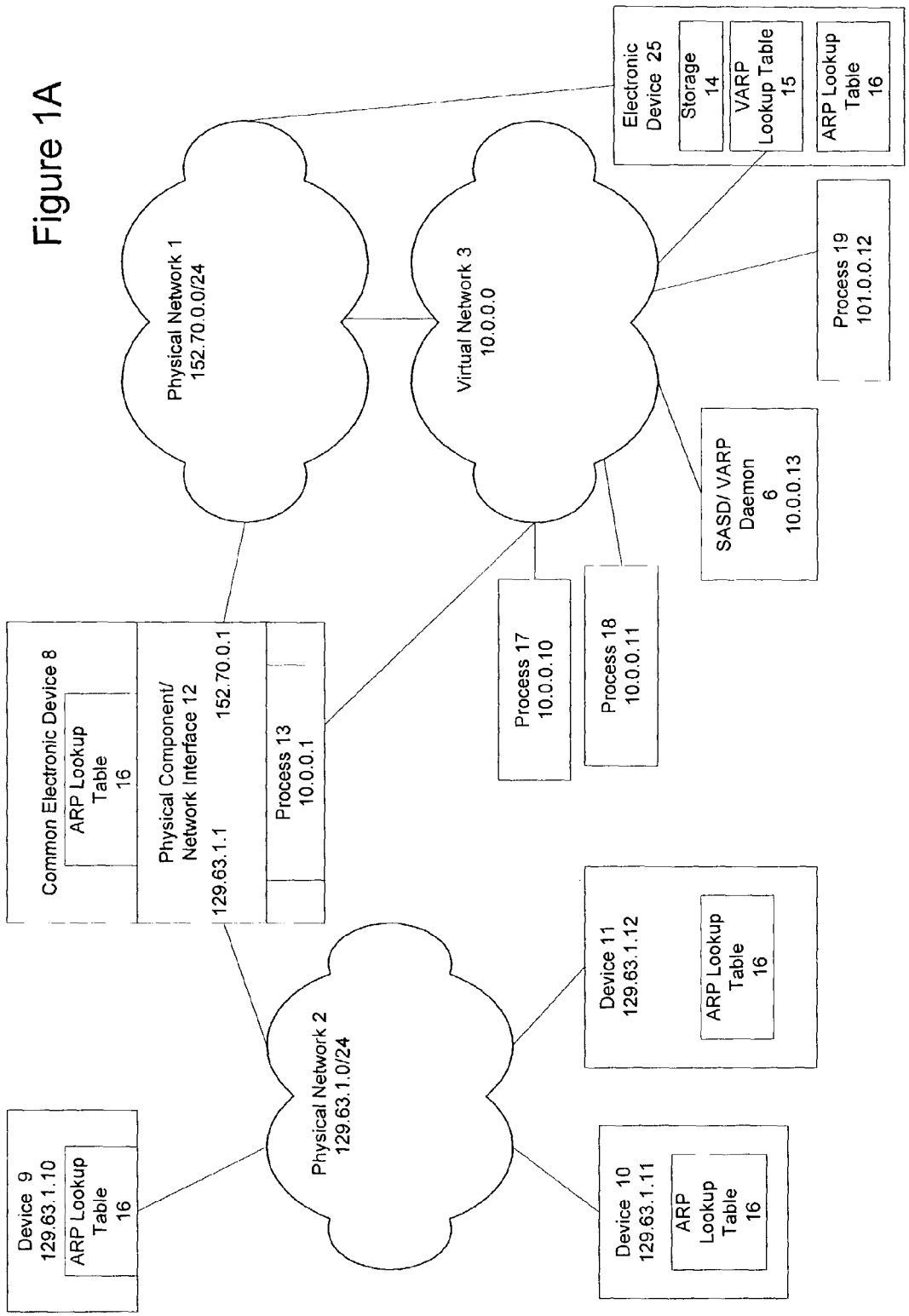
FIG. 1A depicts an environment suitable for practicing the illustrative embodiment of the present invention.

FIG. 1A depicts an environment suitable for practicing the illustrative embodiment of the present invention. A first physical network 1 supports a virtual network 3. The first physical network includes an electronic device 25 with storage 14. Those skilled in the art will realize that each device interfaced with the first physical network will have an ARP lookup table 16. ARP lookups are performed at the sending device by consulting the local ARP lookup table. If the IP address is not in the ARP lookup table, a MAC broadcast is made to the other network devices to check their own ARP lookup tables. The first physical network 1 has devices with IP addresses in the address range of 152.70.0.0/24. The virtual network 3 has virtual IP addresses in the range of 10.0.0.0. The virtual network 3 includes a number of processes with virtual IP addresses 17, 18 and 19. The virtual network 3 also includes a Supernet Administrative System Daemon/Virtual Address Resolution Protocol Daemon (SASD/VARPD) 6 with a virtual IP address of 10.0.0.13. A daemon is a process that runs in the background and performs a specified operation at predefined times or in response to certain events. In the present application, the VARP daemon 6 resolves virtual IP addresses into real IP addresses through the use of a VARP lookup table 15 which holds associations between destination addresses and real IP addresses. Those skilled in the art will also recognize that the VARP daemon 6 may be located at any location accessible over the network.

The first physical network 1 is interfaced with a second physical network 2 through a common electronic device 8 which is a member of both networks. The second physical network has devices with IP addresses in the domain range of 129.63.1.0/24. The "/24" designation is indicative of a CIDR (Classless Inter-Domain Routing) address where the "/24" indicates there are 24 bits of network address. The common electronic device 8 may be a router at the edge of the physical networks. The common electronic device 8 includes a physical component/network interface 12 which has a separate "real" IP address for each physical network. The real IP addresses are assigned to network interface components on the physical networks such as network interface cards. For the first physical network 1, the address of the physical component is 152.70.0.1. For the second physical network 2 the physical component 12 has an IP address of 129.63.1.1. The common electronic device 8 also has a process which has been assigned a virtual IP address of 10.0.0.1 and which is a part of the virtual network 3.

The second physical network 2 includes a number of electronic devices 9, 10 and 11, each with their own real IP address. The illustrative embodiment of the present invention allows a range of real IP addresses in the second physical network 2 to be associated with a single real IP address of the physical component. The association is stored in the VARP lookup table 15. Thus the devices 9, 10 and 11 in the second physical network may be associated with the real IP address of the physical component 12 on the first physical network 152.70.0.1. This allows a process with a virtual IP address 17, 18 or 19 on the first physical network to send an encapsulated data packet directly to a destination address associated with one of the devices 9, 10 and 11 on the second physical network 2. The ability to directly address a destination with a real IP address from a virtual IP address represents an improvement of the VARP protocol in which a user could only address other virtual addresses on the virtual network. The present invention allows a user on a virtual network to send requests directly to a real IP address on a physical network separate from the virtual network (e.g. a user on a corporate virtual network may request his email from his non-work mail server). Those skilled in the art will recognize that the processes 17, 18 and 19 may be located on different hosts in physical network 1.

The VARP Daemon 6 executes a VARP lookup with the VARP lookup table 15 and resolves the destination address to the real IP address of the physical component 12. The real IP address of the physical component 12 is resolved to a MAC address by an ARP lookup using an ARP lookup table and the packet is forwarded to the indicated MAC address. Once the data arrives at the physical component 12, the packet may be examined for the destination address in the encapsulated packet and forwarded. Those skilled in the art will recognize that while a VARP lookup table has been referred to as the method of storing associations, other methods of storing associations between destination addresses and a real IP address may be used without departing from the scope of the present invention.

Figure 1B:
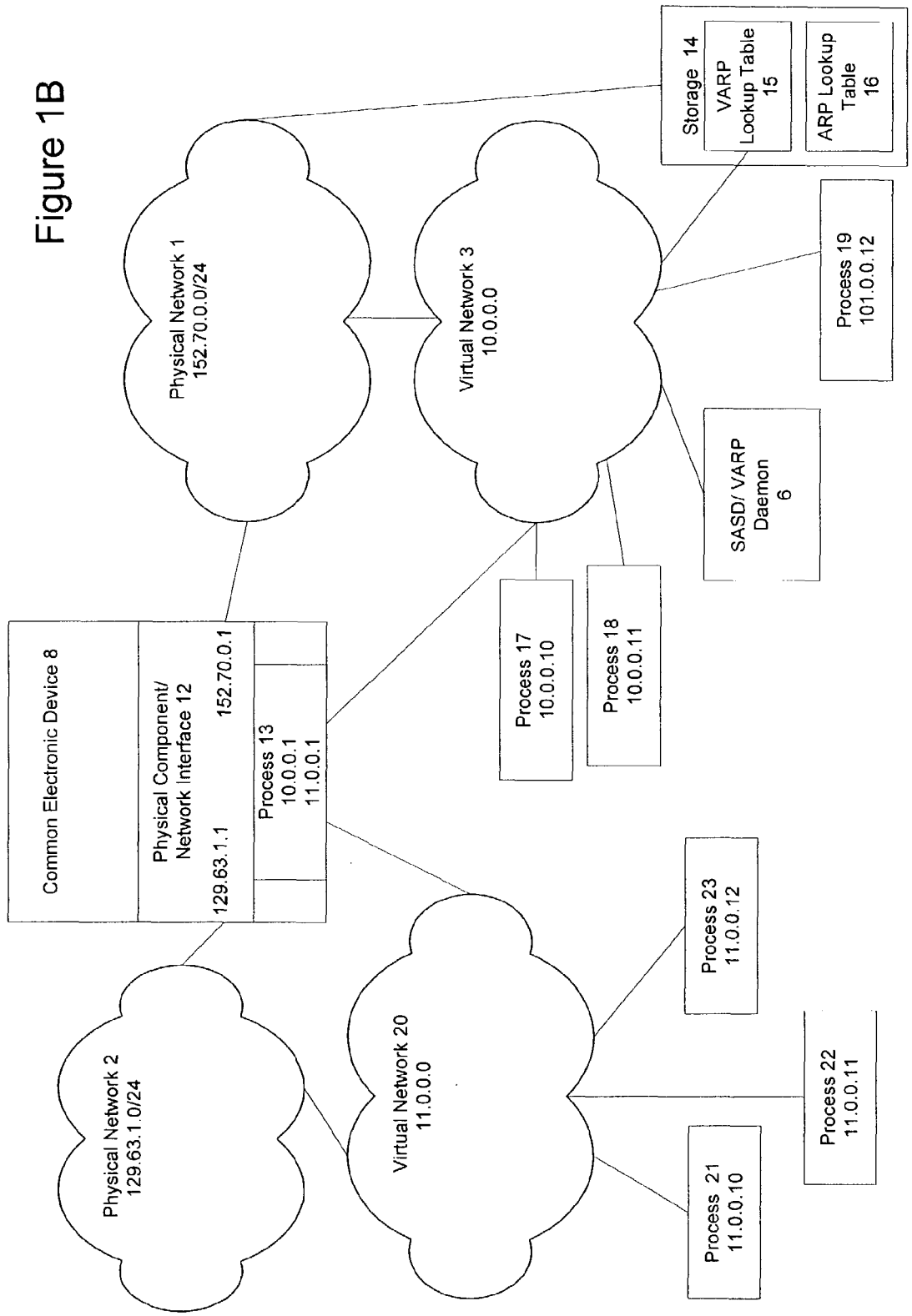
FIG. 1B depicts an alternate environment suitable for practicing the illustrative embodiment of the present invention.

Similarly, the illustrative embodiment of the present invention also extends the VARP protocol to associating ranges of virtual IP addresses with a single real IP address. FIG. 1B depicts an alternate embodiment suitable for practicing the illustrative embodiment of the present invention. The first and second physical networks 1 and 2 and the virtual network 3 of FIG. 1 are depicted as is a second virtual network 20. The second virtual network 20 has a number of process 21, 22 and 23 which have been assigned virtual IP addresses on the second virtual network. The second virtual network uses virtual IP addresses in the 11.0.0.0 domain. The process 13 on the physical component 12 on the common electronic device 8 has been configured into the second virtual network 20 and assigned a virtual IP address of 11.0.0.1. The range of virtual IP addresses for the processes on the second virtual network 20 may be associated with the IP address of the physical component 12 (for the first physical network) 152.70.0.1 and the record of the association stored in the VARP lookup table 15. By following the process as outlined above, data may be sent from a virtual IP address on the first virtual network 3 to a destination (virtual) address on the second virtual network.

The illustrative embodiment of the present invention overlays a virtual network referred to as a Supernet onto a physical network. The Supernet is a virtual network where encrypted data is transferred between virtual IP addresses assigned to different processes on the network. The data is encrypted using SKIP (Secure Key Internet Protocol). Those skilled in the art will recognize that the encryption protocol may be varied without departing from the scope of the present invention.

The illustrative embodiment of the present invention allows the range of addresses from a virtual network to be associated with the real IP address of a component of a physical device acting as a router 42. For example, because there are twenty-four bits in the addressing scheme of the second virtual network 20 and the second physical network 2 in FIG. 1A and FIG. 1B, there are 8 bits in the domain address, thus allowing addresses in the range of 11.0.1.0 to 11.0.1.255 and 129.63.1.0 to 129.63.1.255 respectively to be assigned to the real IP address of the physical component 12 on the first network, 152.70.0.1. The entire range may be associated with the physical component's real IP address. The physical component 12 may then function as a router to route messages throughout the second virtual network 20 or second physical network 2 as appropriate. Those skilled in the art will realize that although the examples illustrated herein use the IPV4 addressing scheme which utilizes a 4 byte IP address, other network addressing schemes such as IPV6 are also within the scope of the current invention.

FIG. 2 depicts a VARP lookup table 15 used to perform VARP lookups by the illustrative embodiment of the present, invention. The VARP lookup table 15, which may be held in a local cache, also helps illustrate differences between the current VARP protocol and the method of the present invention. The VARP lookup table indicates on an entry 50 that a destination IP address on the Supernet of 10.0.0.1 resolves to a real IP address of 152.70.0.1. Similarly an entry 51 indicates that a virtual IP address of 10.0.0.10 resolves to a real IP address of 152.70.0.10. Similarly an entry 52 a virtual IP destination address of 11.0.0.1 resolves to a real IP address of 152.70.0.1. All of the entries 50, 51, and 52 indicate a one-to-one correspondence between the virtual IP address and the real IP address. The illustrative embodiment of the present invention allows the VARP lookup table to associate a range of virtual and real destination IP addresses to a single real IP address. Thus, the entry 53 for the virtual network indicates the virtual IP destinations in the address range of 11.0.1.0/24 all resolve to the real IP address of 152.70.0.1 using the CIDR notation. Alternatively entry 54 indicates that the range of real IP addresses 129.63.1.0-129.63.1.255 resolve to a single real IP address of 152.70.0.1. In either case, the physical component 12 on the edge of both physical networks is able to function as a router in distributing messages intended for the entire range of virtual and real IP addresses. An entry 55 in the VARP lookup table 15 is a default entry. If the destination address is not individually listed and not listed in a network range, a default directs the packet to a designated default destination. There is no difference between start-stop mappings indicating the beginning and ending of a range and CIDR mappings. CIDR mappings are convenient for those cases where bit aligned mappings are being performed. However, the addresses in the VARP lookup table are not required to be bit aligned.

Once the VARP lookup has been conducted and the virtual IP address has been resolved to a real IP address, the message containing an encrypted SKIP packet is forwarded using the resolved real IP address. An ARP lookup is performed to resolve the real IP address into a MAC address for a device component interfaced with the network. The MAC address is a 6 byte address assigned to a physical component. Following the ARP lookup determining the MAC address, the message intended for the virtual IP address can be forwarded to the physical component indicated by the MAC address. Upon arriving the SKIP packet is detected and then examined to determine the virtual IP destination of the encrypted packet. The data is then forwarded to the destination device or process.

Figure 3:
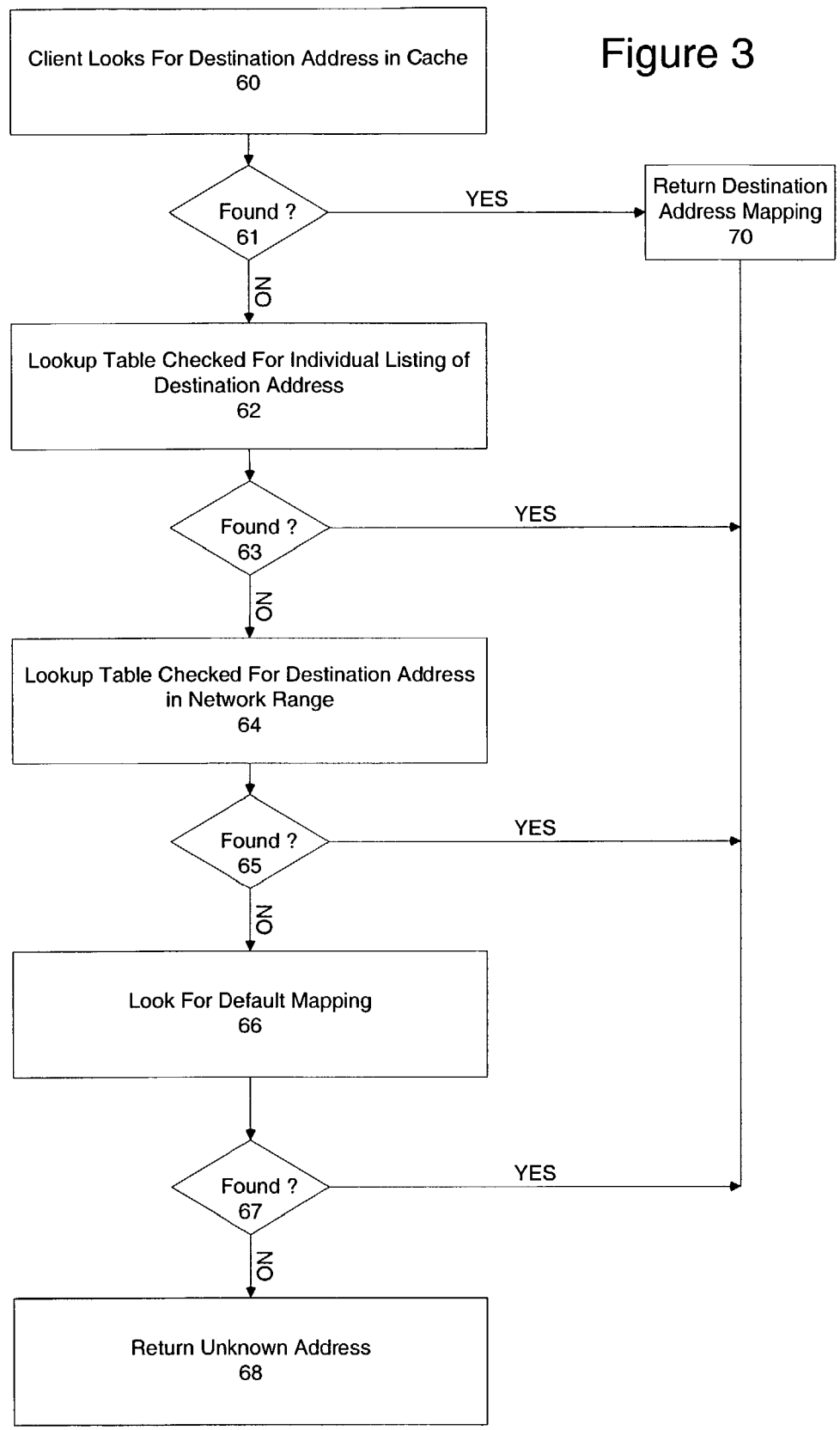
FIG. 3 is a flowchart of the sequence of steps followed by the illustrative embodiment of the present invention to perform a VARP lookup.

The sequence of steps followed by the illustrative embodiment of the present invention to perform VARP lookups is further discussed in the sequence of steps depicted in FIG. 3. The present invention allows cache techniques to be used to reduce lookup times. The results of previous lookups may be stored in a high speed cache. Alternatively, those skilled in the art will recognize that the VARP lookup table 15 may be located in a cache. The lookup sequence begins when a client device sending a packet looks for a resolved IP address in a cache (step 60). If successfully found (step 61) the address is returned and the lookup process halts (step 70). If the address is not found (step 61) the VARP lookup table 15 is checked for an individual listing of the destination address (step 62). If successfully found (step 63) the address is returned and the lookup process halts (step 70). If the address is not found (step 63), the VARP lookup table is checked for a network range listing which includes the destination address.). If successfully found (step 65) the address is returned and the lookup process halts (step 70). If the address is not found (step 65), the VARP lookup table is checked for a default resolution mapping (step 66).). If successfully found (step 67) the address is returned and the lookup process halts (step 70). If the address is not found (step 67), an unknown address message is returned to the searching client device (step 68).

Figure 4:
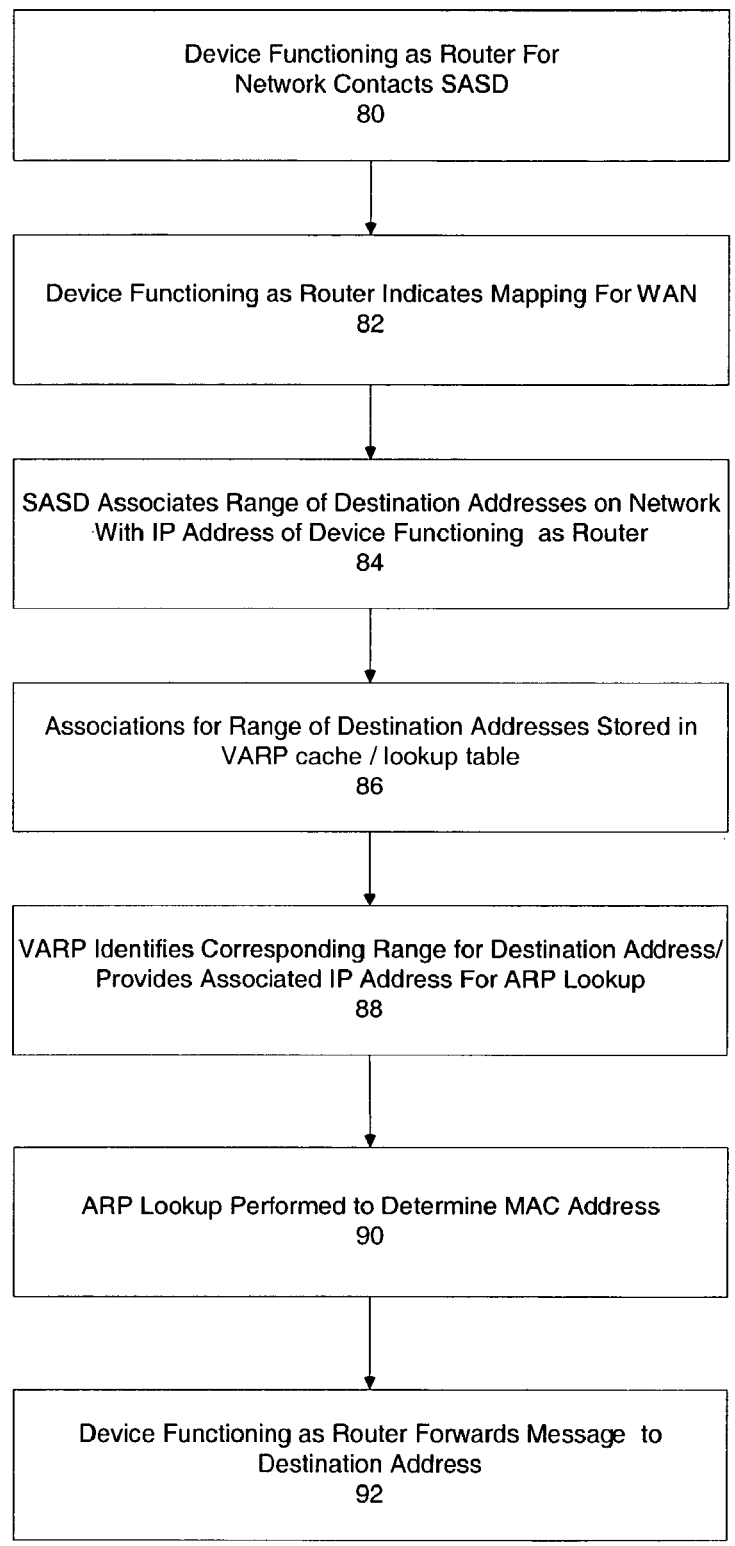
FIG. 4 is a flowchart of the sequence of steps followed by the illustrative embodiment of the present invention to associate a range of virtual IP addresses with a single real IP address in a VARP cache.

FIG. 4 is a flowchart depicting the sequence of steps followed by the illustrative embodiment of the present invention to use a mapped range of destination addresses in delivering data packets sent from a virtual IP address. The sequence begins when a device, functioning as a router for a network, contacts the SASD/VARPD 6(step 80). The routing device does not need to be a traditional dedicated router as long as it contains software to route incoming SKIP packets to their destination. The routing device indicates to the SASD/VARPD that it is mapping for a network (step 82). The SASD/VARPD then associates the range of destination addresses on the network with the routing device's real IP address (step 84). The associations for the range of IP addresses from the network are stored in a VARP cache or lookup table (step 86). When a Supernet message is addressed to a destination address the VARP daemon identifies the corresponding range for that address and provides the associated IP address for the message (step 88). A conventional ARP lookup is performed to resolve the address into a MAC address for the device functioning as a router (step 90). Upon arrival, the routing device detects the skip packet and forwards the message to the appropriate IP address (step 92) out on the network. Those skilled in the art will recognize that for the process of forwarding a SKIP packet from a device acting as a router for a distributed network, a second ARP lookup within the wide area network is required in order to identify the physical device association with the destination IP address.

Those skilled in the art will recognize that a number of different implementations are possible within the scope of the present invention. For example, once messages bearing SKIP packets arrive at a device, they may be forwarded in the clear to their ultimate destination (as may be appropriate in a restricted company-wide network). Alternatively, the packets may be forwarded in encrypted form to their destinations (as may be appropriate if the wide area network is publicly accessible). Alternatively, the multiple virtual networks may exist on a single device instead of in a distributed environment thus allowing the same physical resources to be confidentially utilized by different users.

It will thus be seen that the invention attains the objectives stated in the previous description. Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

We claim:

1. A method of routing data over a network, said network comprising a physical network and a virtual network, said method comprising the steps of:

associating a range of virtual IP addresses within said virtual network with a single real IP address, said range of virtual IP addresses including consecutive virtual IP addresses, said single real IP address identifying a physical component in the network;
storing a record of said range of virtual IP addresses and said association with the single real IP address in a network-accessible location; and
routing data sent from an originating virtual IP address on said network, said routing step comprising:
when said data is addressed to a destination address within said range of virtual IP addresses, resolving the destination address into said single real IP address using said association;
encapsulating said data and said virtual IP destination address within a packet addressed to said single real IP address;
sending said packet to the resolved single real IP address; and
sending said data to a default destination address upon failing to resolve said destination address into the single real IP address.

2. The method of claim 1, wherein said data is encrypted.

3. The method of claim 2, comprising the further step of:
decrypting said packet at said physical component referenced by said single real IP address to determine said virtual destination IP address; and
forwarding said packet to said virtual IP destination address.

4. The method of claim 1, comprising the further steps of:
identifying the range of virtual IP addresses by at least one of listing a starting IP address and an ending IP address in said range and identifying the range of virtual IP addresses using Classless InterDomain Routing (CIDR).

5. The method of claim 1, comprising the further step of:
associating at least one other range of virtual IP addresses configured into a different virtual network with a real IP address.

6. The method of claim 1, wherein said virtual network is located at least in part on an external physical network which also includes said physical component, said external physical network different from said network.

7. The method of claim 1, wherein said single real IP address identifies a physical component in the physical network separate from the virtual network.

8. A method of routing data over a network, said network comprising a first physical network and a second physical network, said first physical network having at least one electronic device supporting a virtual network, said second physical network having a plurality of electronic devices, said first physical network and said second physical network both being interfaced with a common electronic device, said virtual network having a lookup table to resolve a destination address into a real IP address of a component on said first physical network said method comprising:
associating a range of real IP addresses on said second physical network with a single real IP address of a component on said common electronic device;
storing said associations stored in said virtual lookup table; and
routing data from an originating virtual IP address in said virtual network to a destination address on said second physical network, said routing step comprising:
when said data is addressed to a destination address within said range of real IP addresses, resolving said destination address into the single real IP address of said component on said common electronic device;
encapsulating said data and said destination address within a packet addressed to said single real IP address;
sending said packet to said single real IP address;
forwarding said data to said destination address; and
sending said data to a default destination address upon failing to resolve said destination address into the single real IP address.

9. The method of claim 8, wherein said data is encrypted prior to sending, and comprising the further steps of:
decrypting said packet at said physical component referenced by said single real IP address to determine said destination address; and
forwarding said packet to said destination address.

10. In a network, a non-transitory computer readable medium holding computer-executable steps for a method, said method comprising the steps of:
associating a range of virtual IP addresses within a virtual network with a single real IP address, said single real IP address identifying a physical component in the network; the range of virtual IP addresses including consecutive virtual IP addresses;
storing said association in a network-accessible location;
routing data addressed to a destination referenced by one of said range of virtual IP addresses from an originating virtual IP address, said routing step comprising:
when said data is addressed to a destination address within said range of virtual IP addresses, resolving the destination address into said single real IP address using said association;
encapsulating said data and said destination address within a packet addressed to said single real IP address;
sending said packet to said single real IP address; and
sending said data to a default destination address upon failing to resolve said destination address into the single real IP address.

11. The medium of claim 10, wherein said method comprises the further steps of:
encrypting said data and said destination address within the packet addressed to said single real IP address;
decrypting said data at said single real IP address; and
forwarding said data to said destination.

12. A method of routing data over a network, said network comprising a first physical network with at least one electronic device supporting a virtual network, said virtual network having access to a storage location holding associations used to resolve a destination address into a real IP address of a component on said first physical network, said first physical network being interfaced with a second physical network through an electronic device common to said first physical network and said second physical network, said second physical network having a plurality of electronic devices, each with a real IP address, said method comprising the steps of:
associating a range of real IP addresses on said second physical network with a single real IP address of a component on said common electronic device;
storing said association in said storage location; and
routing data from an originating virtual IP address in said virtual network to a destination address on said second physical network, said routing step comprising:
when said data is addressed to a destination address within said range of real IP addresses, resolving said destination address into the single real IP address of said component on said common electronic device using the association in said storage location;

encapsulating said data and said destination address within a packet addressed to said single real IP address;

sending said packet to the resolved single real IP address; and sending said data to a default destination address upon failing to resolve said destination address into the single real IP address.

13. The method of claim 12, comprising the further steps of:

encrypting said data and said destination address in a packet sent to said single real IP address;

decrypting said packet at said single real IP address on said component on said common electronic device; and forwarding said data to said destination address.

14. The method of claim 13, wherein said storage location is a Virtual Address Resolution Protocol lookup table.

* * * * *